US011747838B2

(12) United States Patent
Ueda

(10) Patent No.: US 11,747,838 B2
(45) Date of Patent: Sep. 5, 2023

(54) VEHICLE CONTROL SYSTEM

(71) Applicant: TOYOTA JIDOSHA KABUSHIKI KAISHA, Toyota (JP)

(72) Inventor: Kazuhiko Ueda, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/085,911

(22) Filed: Dec. 21, 2022

(65) Prior Publication Data

US 2023/0120154 A1 Apr. 20, 2023

Related U.S. Application Data

(63) Continuation of application No. 16/680,944, filed on Nov. 12, 2019, now Pat. No. 11,609,588.

(30) Foreign Application Priority Data

Nov. 14, 2018 (JP) ................................. 2018-213944

(51) Int. Cl.
*G05D 25/02* (2006.01)
*G05D 1/02* (2020.01)
(Continued)

(52) U.S. Cl.
CPC ......... *G05D 25/02* (2013.01); *B60W 30/0956* (2013.01); *F21S 41/10* (2018.01); *G05D 1/021* (2013.01); *B60W 2040/0863* (2013.01)

(58) Field of Classification Search
CPC ...... B60W 30/0956; B60W 2040/0863; G05D 25/02; G05D 1/021; F21S 41/10
(Continued)

(56) References Cited

U.S. PATENT DOCUMENTS 6,947,576 B2 * 9/2005 Stam .................... G06V 10/141
382/104
7,653,215 B2 * 1/2010 Stam .................... B60Q 1/1423
382/104
(Continued)

FOREIGN PATENT DOCUMENTS

JP   200673013 A   3/2006
JP   2009151522 A   7/2009
(Continued)

OTHER PUBLICATIONS

Corrected Notice of Allowability dated Sep. 21, 2022 to U.S. Appl. No. 16/680,807, filed Nov. 12, 2019.
(Continued)

*Primary Examiner* — Yazan A Soofi
(74) *Attorney, Agent, or Firm* — Dinsmore & Shohl LLP

(57) ABSTRACT

A vehicle includes a light switch for manually operating a lighting state of a lighting device. The light switch includes a light-off position and an auto-light position for executing an auto-light process. A vehicle control system includes a first controller for executing an automated driving of the vehicle, and a second controller for controlling a lighting state of the lighting device based on a request from the first controller or operation information of the light switch. The first controller is configured to transmit an auto-light request for executing the auto-light process to the second controller during execution of the automated driving. The second controller is configured to execute the auto-light process when the auto-light request is received from the first controller in a state where the light switch is operated to the light-off position.

4 Claims, 10 Drawing Sheets

(51) Int. Cl.
  *F21S 41/10* (2018.01)
  *B60W 30/095* (2012.01)
  *B60W 40/08* (2012.01)

(58) Field of Classification Search
  USPC .......................................................... 250/205
  See application file for complete search history.

(56) References Cited

U.S. PATENT DOCUMENTS

| | | | |
|---|---|---|---|
| 8,120,652 B2* | 2/2012 | Bechtel | B60R 1/00 |
| | | | 348/148 |
| 9,410,491 B2 | 8/2016 | Chang | |
| 11,435,746 B1* | 9/2022 | Ebrahimi Afrouzi | A47L 9/009 |
| 2003/0138132 A1 | 7/2003 | Stam | |
| 2004/0218401 A1 | 11/2004 | Okubo | |
| 2005/0278093 A1 | 12/2005 | Kameyama | |
| 2006/0177098 A1 | 8/2006 | Stam | |
| 2009/0010494 A1* | 1/2009 | Bechtel | G06V 20/584 |
| | | | 382/104 |
| 2012/0116632 A1 | 5/2012 | Bechtel | |
| 2013/0345935 A1* | 12/2013 | Chang | F02D 11/02 |
| | | | 701/49 |
| 2014/0156133 A1* | 6/2014 | Cullinane | B60K 37/06 |
| | | | 701/23 |
| 2015/0002015 A1 | 1/2015 | Hayakawa | |
| 2015/0073621 A1 | 3/2015 | Kida | |
| 2017/0235306 A1 | 8/2017 | Seki | |
| 2017/0322558 A1 | 11/2017 | Teshima et al. | |
| 2017/0332010 A1 | 11/2017 | Asakura et al. | |
| 2018/0043904 A1* | 2/2018 | Cullinane | B60K 35/00 |
| 2018/0111628 A1 | 4/2018 | Tamagaki et al. | |
| 2018/0181128 A1 | 6/2018 | Urano | |
| 2018/0334173 A1* | 11/2018 | Cullinane | B60W 50/082 |
| 2019/0039617 A1 | 2/2019 | Miura et al. | |
| 2020/0148171 A1* | 5/2020 | Ueda | B60W 40/02 |
| 2020/0150658 A1 | 5/2020 | Ueda | |
| 2020/0150702 A1* | 5/2020 | Ueda | G05D 25/02 |
| 2020/0198586 A1 | 6/2020 | Doi | |
| 2021/0188281 A1* | 6/2021 | Jung | B60W 60/0053 |

FOREIGN PATENT DOCUMENTS

| | | |
|---|---|---|
| JP | 201419390 A | 2/2014 |
| JP | 201424368 A | 2/2014 |
| JP | 201554604 A | 3/2015 |
| JP | 201688201 A | 5/2016 |
| JP | 2016196285 A | 5/2016 |
| JP | 2017138724 A | 8/2017 |
| JP | 2017146723 A | 8/2017 |
| JP | 2017202768 A | 11/2017 |
| JP | 2018132533 A | 8/2018 |

OTHER PUBLICATIONS

Notice of Allowance dated Jul. 21, 2022, for U.S. Appl. No. 16/680,807, filed Nov. 12, 2019.
Notice of Allowance dated Jul. 18, 2022, for U.S. Appl. No. 16/680,954, filed Nov. 12, 2019.
Non-Final Office Action dated Mar. 22, 2022 in related U.S. Appl. No. 16/680,954, filed Nov. 12, 2019.
Office Action dated Feb. 16, 2022 for U.S. Appl. No. 16/680,807.
U.S. Appl. No. 16/680,807, filed Nov. 12, 2019 Inventor: Kazuhiko Ueda.
U.S. Appl. No. 16/680,954, filed Nov. 12, 2019 Inventor: Kazuhiko Ueda.
Notice of Allowance dated Jan. 19, 2023 to U.S. Appl. No. 16/680,944, filed Nov. 12, 2019.
Corrected Notice of Allowability dated Oct. 26, 2022 to U.S. Appl. No. 16/680,807, filed Nov. 12, 2019.

\* cited by examiner

VEHICLE CONTROL SYSTEM

CROSS-REFERENCE TO RELATED APPLICATION

This application is a continuation application of co-pending U.S. patent application Ser. No. 16/680,944, filed Nov. 12, 2019, for "Vehicle Control System," which claims priority from, Japanese Patent Application Serial Number 2018-213944, filed on Nov. 14, 2018, the disclosure of which is hereby incorporated by reference herein in its entirety.

FIELD

The present disclosure relates to a vehicle control system, and more particularly, to a vehicle control system for controlling an operation of a lighting device during automated driving of a vehicle.

BACKGROUND

Japanese Patent Laid-Open No. 2018-132533 discloses a vehicle warning device capable of switching between a manual operation by a driver and an automated driving by an in-vehicle computer. In the automated driving at level 3 or higher in the level definition of SAE (Society of Automotive Engineers), a second task such as an operation of a portable terminal is permitted to the driver. In this technique, when the driver is caused to perform the manual operation during the automated driving in which the second task is permitted, warning information for causing the driver to start the manual operation is displayed on a screen of a portable terminal displaying a content together with the content.

SUMMARY

An operation switch of a lighting device such as a headlight is installed in a place such as a steering column or a dash panel where a driver can easily operate. Accordingly, the driver seated in a driver's seat may unintentionally touch these operation switches. If an operation of the lighting device is switched by such an erroneous operation, the headlight may not be turned on even if a periphery of the vehicle is darkened during an automated driving. In this case, it is difficult to continue the automated driving because a forward visibility may not be clearly obtained, and a request for switching to a manual operation is issued. However, in a situation where the forward visibility is not obtained, the driver may not change driving with a sense of security. The problem of the erroneous operation of the operation switch is particularly conspicuous in the automated driving at level 3 or higher in which the second task is permitted.

The present disclosure has been made in view of the above-mentioned problems, and an object of the present disclosure is to provide a vehicle control system capable of ensuring a forward visibility during an automated driving by optimizing an operation of a lighting device during the automated driving.

In order to solve the above problems, a first disclosure is applied to a vehicle control system installed on a vehicle. The vehicle includes a light switch for manually operating a lighting state of a lighting device installed on a body. The light switch includes a light-off position in which the lighting device is always turned off, and an auto-light position to execute an auto-light process in which the lighting state of the lighting device is automatically switched according to a luminance of an external environment. The vehicle control system includes a first controller configured to execute an automated driving of the vehicle, and a second controller configured to control a lighting state of the lighting device based on a request from the first controller or operation information of the light switch. The first controller is configured to transmit an auto-light request for executing the auto-light process to the second controller during execution of the automated driving. The second controller is configured to execute the auto-light process when the auto-light request is received from the first controller in a state where the light switch is operated to the light-off position.

A second disclosure has the following features in the first disclosure. The lighting device includes a small lamp including a side marker lamp or a tail lamp, and a headlight. The light switch further includes a small-lamp-on position for constantly lighting the small lamp. The auto-light process is configured to turn on the small lamp when a luminance of an external environment detected by a luminance sensor is smaller than a predetermined first determination value, and to turn on the headlight when the luminance is smaller than a second determination value smaller than the first determination value. The second controller is configured to execute the auto-light process when the luminance is smaller than the second determination value in a case where the auto-light request is received from the first controller in a state where the light switch is operated to the small-lamp-on position.

A third disclosure has the following features in the first or second disclosure. The first controller is configured to transmit, during execution of the automated driving, a specific operation rejection request for executing a specific operation rejection process for rejecting control of the lighting device based on a specific operation of the light switch to the second controller. The specific operation includes an operation of the light switch to the light-off position. The second controller is configured to execute the specific operation rejection process when the specific operation rejection request is received from the first controller.

A fourth disclosure has the following features in any one of the first to third disclosures. The lighting device includes a headlight capable of adjusting a light distribution. The light switch includes a light distribution control switch for operating ON and OFF of a light distribution control for automatically controlling the light distribution of the headlight according to an external environment. The second controller is configured to execute the light distribution control when the light distribution control switch is operated to be ON, and stop the light distribution control when the light distribution control switch is operated to be OFF. The first controller is configured to transmit a light distribution control request for executing the light distribution control to the second controller during execution of the automated driving. The second controller is configured to execute the light distribution control when the light distribution control request is received from the first controller in a state where the light distribution control switch is operated to be OFF.

A fifth disclosure has the following features in the fourth disclosure. The first controller is configured to transmit a specific operation rejection request for executing a specific operation rejection process to the second controller during execution of the automated driving. Here, the specific operation rejection process is configured to reject the control of the lighting device based on the specific operation of the light switch. The specific operation includes an operation to OFF of the light distribution control switch. The second controller is configured to execute the specific operation rejection process when the specific operation rejection request is received from the first controller.

According to the vehicle control system of the first disclosure, even if the light switch is manually operated to the light-off position, the auto-light process is executed during the automated driving. Accordingly, since the forward visibility is secured during the automated driving, the driver may change the driving with a sense of security.

According to the second disclosure, even if the light switch is manually operated to the small-lamp-on position during the automated driving, the auto-light process is executed when the small lamp is turned on by the auto-light process. Accordingly, since the forward visibility is secured during the automated driving, the driver may change the driving with a sense of security.

According to the third disclosure, during the automated driving, it is possible to reject the control of the lighting device by the specific operation including a manual operation of the light switch to the light-off position. Accordingly, even if the driver erroneously operates the light switch during the automated driving, the lighting device may be prevented from being turned off.

According to the fourth disclosure, the light distribution control is executed even if the light distribution control switch is turned off during the automated driving. Accordingly, since the forward visibility is secured during the automated driving, the driver may change the driving with a sense of security.

According to the fifth disclosure, it is rejected to stop the light distribution control by a manual operation of the light distribution control switch to OFF during the automated driving. Accordingly, even if the driver erroneously operates the light distribution control switch during the automated driving, the light distribution control may be prevented from being stopped.

As described above, according to the present disclosure, since the operation of the lighting device during automated driving is optimized, it is possible to ensure a forward visibility during automated driving. As a result, the driver may change driving with a sense of security.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

1. FIRST EMBODIMENT 1-1. Overall Configuration of Vehicle Control System

Figure 1:
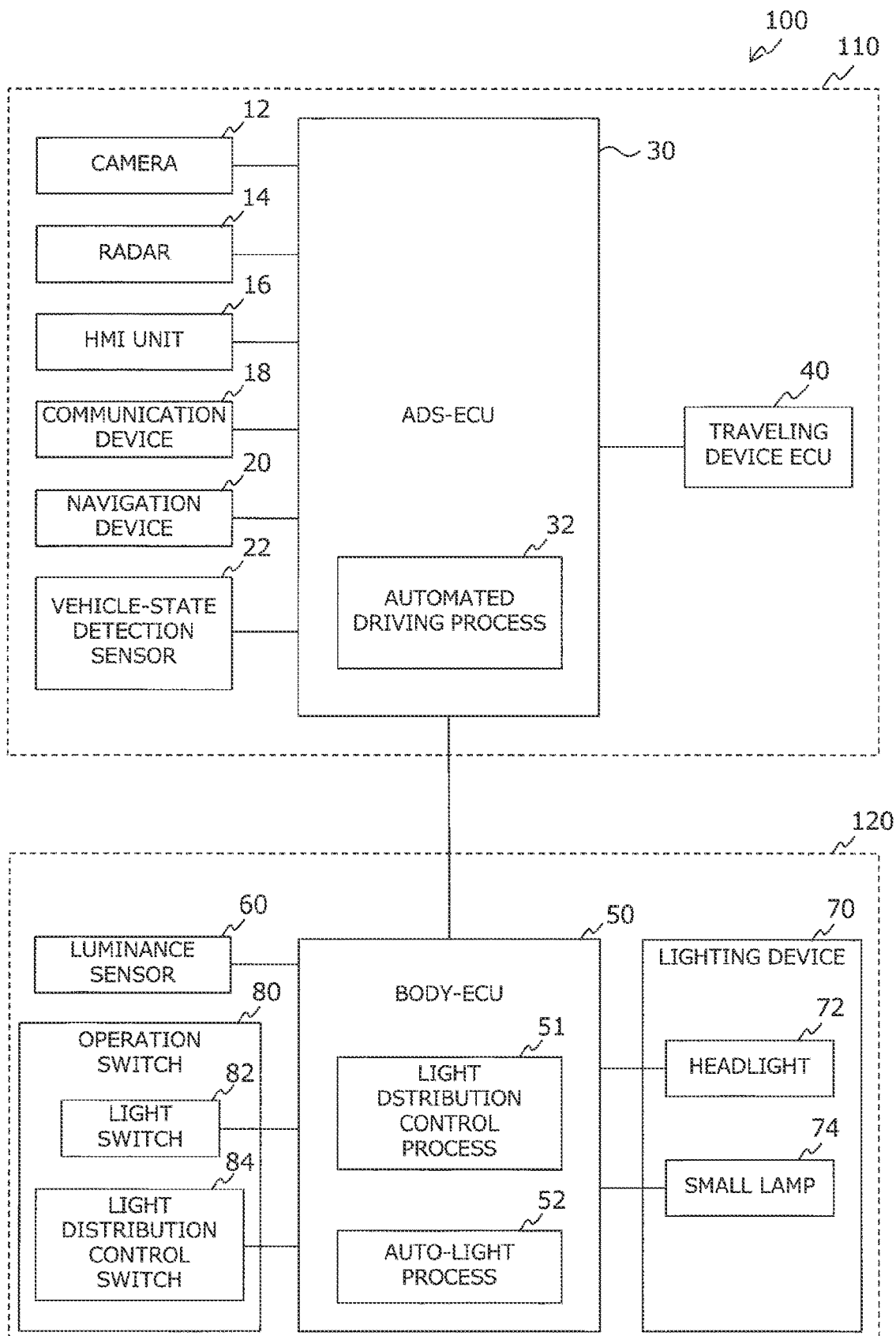
FIG. 1 is a block diagram showing an example of a configuration of a vehicle control system according to a first embodiment.

FIG. 1 is a block diagram showing a configuration example of a vehicle control system according to the first embodiment. The vehicle control system 100 shown in FIG. 1 is installed on a vehicle. Hereinafter, the vehicle on which the automated driving system is installed is also referred to as "vehicle M1". Examples of the vehicle M1 include an automobile that uses an internal combustion engine as a power source, an electric automobile that uses an electric motor as a power source, and a hybrid automobile that includes an internal combustion engine and an electric motor. The electric motor is driven by a battery such as a secondary battery, a hydrogen fuel cell, a metal fuel cell, an alcohol fuel cell, or the like.

As shown in FIG. 1, the vehicle control system 100 includes a first control system 110 and a second control system 120. The first control system 110 is a system for executing automated driving of the vehicle M1. The second control system 120 is a system for controlling an operation of a lighting device 70 of the vehicle M1. Hereinafter, the configuration of these systems will be described.

The first control system 110 includes an electronic control unit (hereinafter, also referred to as "ADS-ECU") 30 for automated driving control. The first control system 110 includes camera 12, a radar 14, an HMI unit 16, a communication device 18, a navigation device 20, and a vehicle-state detection sensor 22, all of which are connected to inputs of the ADS-ECU 30. Furthermore, the first control system 110 includes an electronic control unit (hereinafter also referred to as "travelling device ECU") 40 for a traveling device that is connected to an output-side of the ADS-ECU 30.

The camera 12 functions as information acquisition means for acquiring peripheral information of the vehicle M1, for example, a front camera for capturing an image of the front of the vehicle M1, a left-rear camera for capturing an image of a left-rear of the vehicle M1, and a right-rear camera for capturing an image of a right-rear of the vehicle M1. The images picked up by the cameras 12 are transmitted as image data to the ADS-ECU 30 at any time, and are subjected to image processes on the respective image data in the ADS-ECU 30. The peripheral information acquired by the camera 12 is, for example, position information and white line information of peripheral vehicles traveling around the vehicle M1, and road information such as signal information. The peripheral information acquired by the cameras 12 is also transmitted to a BODY-ECU 50 (described later) at any time.

The radar 14 is, for example, a laser radar, a millimeter wave radar, or the like, and functions as information acquisition means for acquiring peripheral information of the vehicle M1. The radar 14 transmits a laser wave or the like to the front and the rear of the vehicle M1, respectively, and receives the reflected wave to acquire peripheral information of the vehicle M1. The peripheral information acquired by the radar 14 includes, for example, information on the presence or absence of a peripheral vehicle, distance to the peripheral vehicle, angle (i.e., relative position) and speed (relative speed) information, and positional information of a utility pole, a building, or the like. The respective pieces of information detected by the radar 14 are transmitted to the ADS-ECU 30 at any time.

The HMI unit 16 is an interface for providing information to the driver of the vehicle M1 and for receiving information from the driver. For example, the HMI unit 16 includes an input device, a display device, and a speaker. Examples of the input device include a touch panel, a keyboard, a switch, and a button. The driver may input information such as a destination using the input device to the HMI unit 16. The information input from the driver is transmitted to the ADS-ECU 30 at any time.

The communication device 18 functions as an information acquisition unit that receives peripheral information from a roadside system provided on a road via an antenna provided in the vehicle M1. The roadside system is, for example, a beacon device that transmits, for example, traffic jam information, traffic information by lane, regulation information such as a stop, traffic situation information of a blind spot positions, and the like. The communication device 18 also functions as an information acquiring means for communicating with a peripheral vehicle in the vicinity of the vehicle M1, directly via an antenna, or via a relay station (not shown). The peripheral information acquired here includes, for example, position information and speed information of peripheral vehicles. The respective pieces of information received by the communication device 18 are transmitted to the ADS-ECU 30 at any time.

The navigation device 20 detects the current position of the vehicle M1 from a GPS satellite via an antenna. The navigation device 20 also detects the traveling speed of the vehicle M1 and guides the vehicle to the destination by using the GPS, a speed sensor, a gyroscope, and the like. The navigation device 20 incorporates map data including detailed road information. The map data includes, for example, information on the shape of the road, the number of lanes, the lane width, and the like. The present position information, the road information, and the like acquired by the navigation device 20 are transmitted to the ADS-ECU 30 at any time.

The vehicle-state detection sensor 22 detects the traveling state of the vehicle M1. Examples of the vehicle-state detection sensor 22 include a vehicle speed sensor, a lateral acceleration sensor, and a yaw rate sensor. The information detected by the vehicle-state detection sensor 22 is transmitted to the ADS-ECU 30 at any time.

The ADS-ECU 30 corresponds to a first controller of the vehicle control system 100. Typically, the ADS-ECU 30 is a microcomputer including a processor, memories, and input/output interfaces. The ADS-ECU 30 executes automated driving for automatically driving the vehicle M1. The ADS-ECU 30 includes an automated driving processing unit 32 as a functional block for executing automated driving of the vehicle M1. The automated driving processing unit 32 receives information necessary for automated driving from various information acquisition means via the input/output interface. Then, the automated driving processing unit 32 executes automated driving based on the received information. Specifically, the automated driving processing unit 32 calculates a travel plan of the vehicle M1, and outputs information to the traveling device ECU 40 so that the vehicle M1 travels in accordance with the travel plan.

The traveling device ECU 40 is a microcomputer having the same configuration as the ADS-ECU 30. The traveling device ECU 40 is composed of a plurality of ECUs. These ECUs control various types of traveling devices (not shown) for automated traveling the vehicle M1 in accordance with various types of information inputted from the ADS-ECU 30. These traveling devices include a driving force output device, a steering device, and a braking device. The driving force output device is a power source for generating a traveling driving force. The steering device steers the wheels. The braking device generates a braking force.

A known technique is applied to the automated driving executed by the ADS-ECU 30. Therefore, descriptions of the functions of the ADS-ECU 30 related to the automated driving are provided only in the above description. The details of the functions related to the features of the present embodiment will be described later.

The second control system 120 includes an electronic control unit (hereinafter, also referred to as "BODY-ECU") 50 for controlling accessories. The second control system 120 includes a luminance sensor 60 and an operation switch 80, all of which are connected to inputs of the BODY-ECU 50. The second control system 120 further includes a lighting device 70 connected to an output-side of the BODY-ECU 50.

The luminance sensor 60 detects a luminance of an external environment at the position of the vehicle M1. The luminance sensor 60 is installed, for example, on the back side of a windshield near a room mirror. The luminance sensor 60 transmits the detected information (hereinafter, also referred to as "luminance information") to the BODY-ECU 50 at any time. The luminance sensor 60 may transmit the luminance data not only to the BODY-ECU 50 but also to the ADS-ECU 30. In this instance, the luminance information is transmitted to the ADS-ECU 30 as one of the information detected by the external sensor.

The lighting device 70 is a component attached to the body of the vehicle M1, and includes a headlight 72 and a small lamp 74. The headlight 72 is configured to be able to adjust the light distribution by switching between a high beam and a low beam, for example. The small lamp 74 includes a side marker lamp disposed in front of and behind the vehicle M1 and a tail lamp disposed behind the vehicle. The operation switch 80 is a switch for manually operating the operation state of the lighting device 70. Specifically, the operation switch 80 includes a light switch 82 and a light distribution control switch 84.

Figure 2:
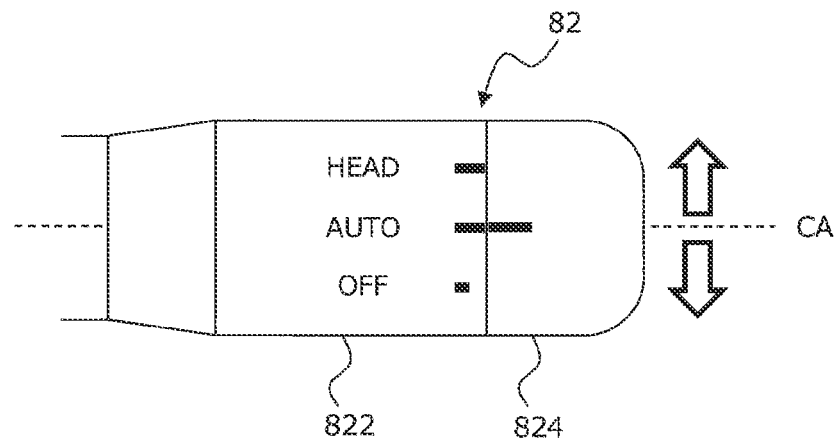
FIG. 2 is a schematic diagram showing a configuration example of a light switch.

FIG. 2 is a schematic diagram showing a configuration example of the light switch. The light switch 82 shown in FIG. 2 is disposed on a right side of a steering column of the vehicle M1. The light switch 82 includes a main body 822 and a knob 824. The knob 824 is provided at the distal end of the main body 822. The knob 824 is rotatably supported around the central axis CA of the light switch 82.

The main body 822 has three positions at which the rotation of the knob 824 is stopped (hereinafter, also referred to as "light switch positions"). The positions of "AUTO", "HEAD" and "OFF" shown in FIG. 2 correspond to the light switch positions. In the following explanation, the position of "HEAD" among the light switch positions is also denoted as "light-on position", the position of "AUTO" is also denoted as "auto-light position", and the position of "OFF" is also denoted as "light-off position".

When the light switch position is in the "light-on position", a light-on signal is transmitted from the light switch 82 to the BODY-ECU 50. When the light switch position is in the "auto-light position", the light switch 82 transmits an auto-light signal to the BODY-ECU 50. When the light switch position is in the "light-off position", the light switch 82 transmits a light-off signal to the BODY-ECU 50.

Figure 3:
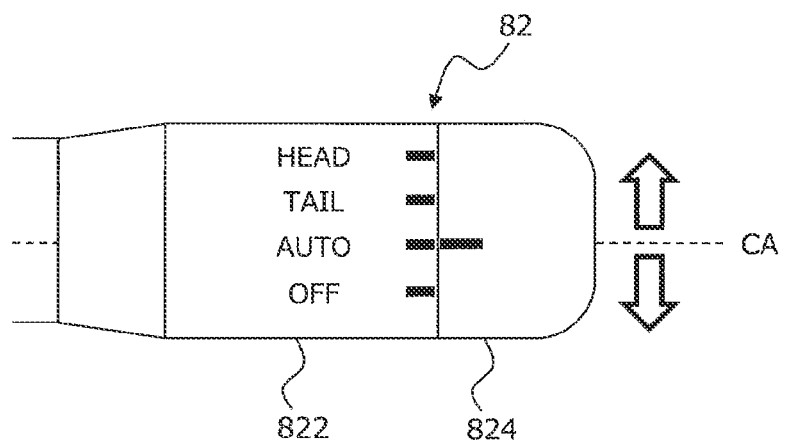
FIG. 3 is a schematic diagram showing another configuration example of the light switch.

FIG. 3 is a schematic diagram showing another configuration example of the light switch. This configuration example is basically the same as the configuration example of the light switch shown in FIG. 2. Unlike the configuration example shown in FIG. 2, in the configuration example shown in FIG. 3, a position of "TAIL" is added to the light switch position. In the following explanation, the position of "TAIL" in the light switch position is also referred to as "small-lamp-on position".

The configuration example shown in FIG. 3 is applied to the vehicle M1 in which the lighting operation of the small lamp 74 is executed manually in addition to the lighting operation of the headlight 72. In the configuration shown in FIG. 3, when the light switch position is in the "small-lamp-on position", the small lamp on signal is transmitted from the light switch 82 to the BODY-ECU 50.

The light distribution control switch 84 is a switch for switching ON and OFF of the light distribution control for automated adjusting the light distribution of the headlight 72. The light distribution control switch 84 is configured as, for example, a push-type switch which is switched between ON and OFF every time it is pressed. The light distribution control switch 84 is disposed, for example, at a position where a driver may operate on a dash panel.

When the light distribution control switch 84 is ON, a light distribution control-on signal is transmitted from the light distribution control switch 84 to the BODY-ECU 50. When the light distribution control switch 84 is OFF, a light distribution control-off signal is transmitted from the light distribution control switch 84 to the BODY-ECU 50.

The BODY-ECU 50 includes a light distribution control processing unit 51 as a functional block for executing a process of the light distribution control. When the light distribution control-on signal is received from the light distribution control switch 84, the light distribution control processing unit 51 executes the light distribution control. Specifically, the light distribution control processing unit 51 controls AHB (Automatic High Beam) and AHS (Adaptive High beam System) as the light distribution control. In the AHB control, for example, based on the peripheral information acquired by the camera 12, the headlight and taillight of an oncoming vehicle or a preceding person are detected, and the high beam and the low beam of the headlight 72 are automatically switched. In the AHS control, the light distribution corresponding to the driving scene of the vehicle M1 is realized based on, for example, the peripheral information acquired by the camera 12 and the vehicle speed information. A known technique is applied to the light distribution control executed in the light distribution control processing unit 51 of the BODY-ECU 50. Accordingly, the detailed description of the function of the light distribution control processing unit 51 related to the light distribution control will be omitted.

The BODY-ECU 50 corresponds to the second controller of the vehicle control system 100. The BODY-ECU 50 is a microcomputer including a processor, memories, and input/output interfaces. The BODY-ECU 50 receives external environmental information from the luminance sensor 60 and operation information from the operation switch 80 via the input/output interfaces. The BODY-ECU 50 controls the operation of the lighting device 70 based on the received data.

1-2. Headlight Control

The control of the lighting device 70 executed by the BODY-ECU 50 includes a headlight control. The BODY-ECU 50 controls the lighting operation of the headlight 72 based on the input signal from the light switch 82 and the luminance information. When the light-on signal is inputted from the light switch 82, the BODY-ECU 50 always lights the headlight 72. When the auto-light signal is inputted from the light switch 82, the BODY-ECU 50 executes an auto-light process for turning on or off the headlight 72 in accordance with the luminance information. Further, when the light-off signal is inputted from the light switch 82, the BODY-ECU 50 always turns off the headlight 72.

The BODY-ECU 50 includes an auto-light processing unit 52 as a functional block for executing the auto-light process. When the auto-light signal is inputted from the light switch 82, the BODY-ECU 50 executes the control routine shown in FIG. 4 in the auto-light processing unit 52.

Figure 4:
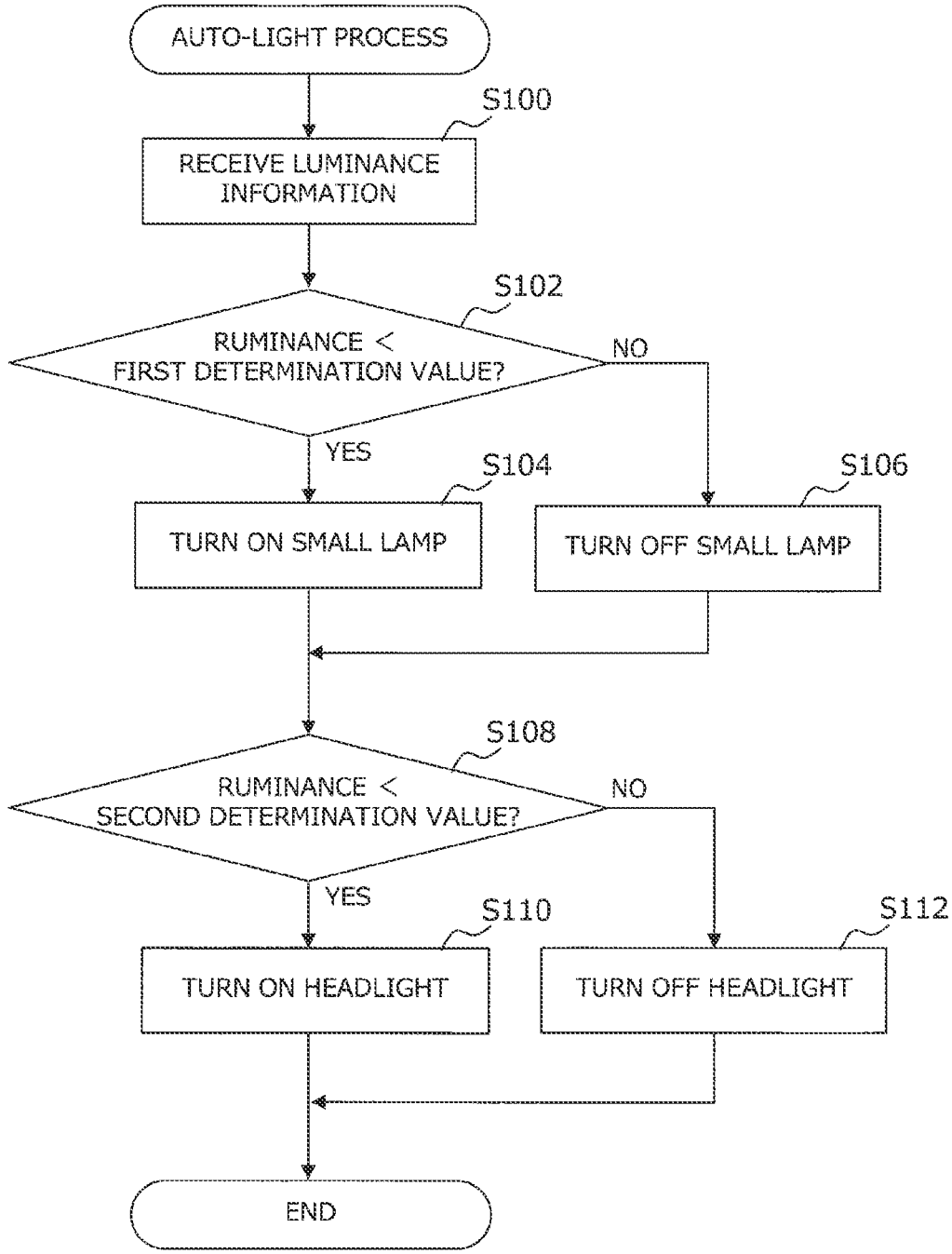
FIG. 4 is a flowchart showing a control routine for executing the auto-light process.

FIG. 4 is a flow chart showing a control routine for executing the auto-light process. First, the BODY-ECU 50 receives the luminance information from the luminance sensor 60 (step S100). Next, the BODY-ECU 50 determines whether or not the received luminance is smaller than a first determination value (step S102). Here, the first determination value is a threshold value of the luminance of the external environment for determining whether or not the small lamp 74 needs to be turned on. As a result, if the determination is successful, the BODY-ECU 50 turns on the small lamp 74 (step S104). On the other hand, if the determination is not satisfied, the BODY-ECU 50 turns off the small lamp 74 (step S106).

When the process of step S104 or S106 is completed, then, the BODY-ECU 50 determines whether or not the received luminance is smaller than a second determination value (step S108). Here, the second determination value is a threshold value of the luminance of the external environment for determining whether or not the headlight 72 needs to be turn on, and is a value smaller than the first determination value, i.e., a value on the dark side. As a result, if the determination is successful, the BODY-ECU 50 turns on the headlight 72 (step S110). On the other hand, if the determination is not satisfied, the BODY-ECU 50 turns off the headlight 72 (step S112).

1-3. Features of the Vehicle Control System According to the First Embodiment The light switch 82 of the vehicle M1 is located in the steering column. For that reason, the driver may unintentionally touch the light switch 82. If the light switch position is switched to the light off position or the small-lamp-on position by such an erroneous operation, the headlight 72 may not be turn on even if the periphery of the vehicle M1 is darkened during the automated driving. In this case, it is difficult to continue the automated driving because the forward visibility may not be clearly obtained, and a request for switching to the manual operation is issued. However, there is a problem that the driver may not change driving with a sense of security in a situation where the forward visibility is not obtained.

Therefore, when the light switch position during the automated driving is the light off position, the vehicle control system 100 according to the first embodiment executes a compulsory auto-light control for compulsorily executing the auto-light process. Further, the vehicle control system 100 of the first embodiment executes the compulsory auto-light control only in the case where the external environment is the environment in which the headlight 72 should be turned on, when the light switch position during the automated driving is the small-lamp-on position.

Figure 5:
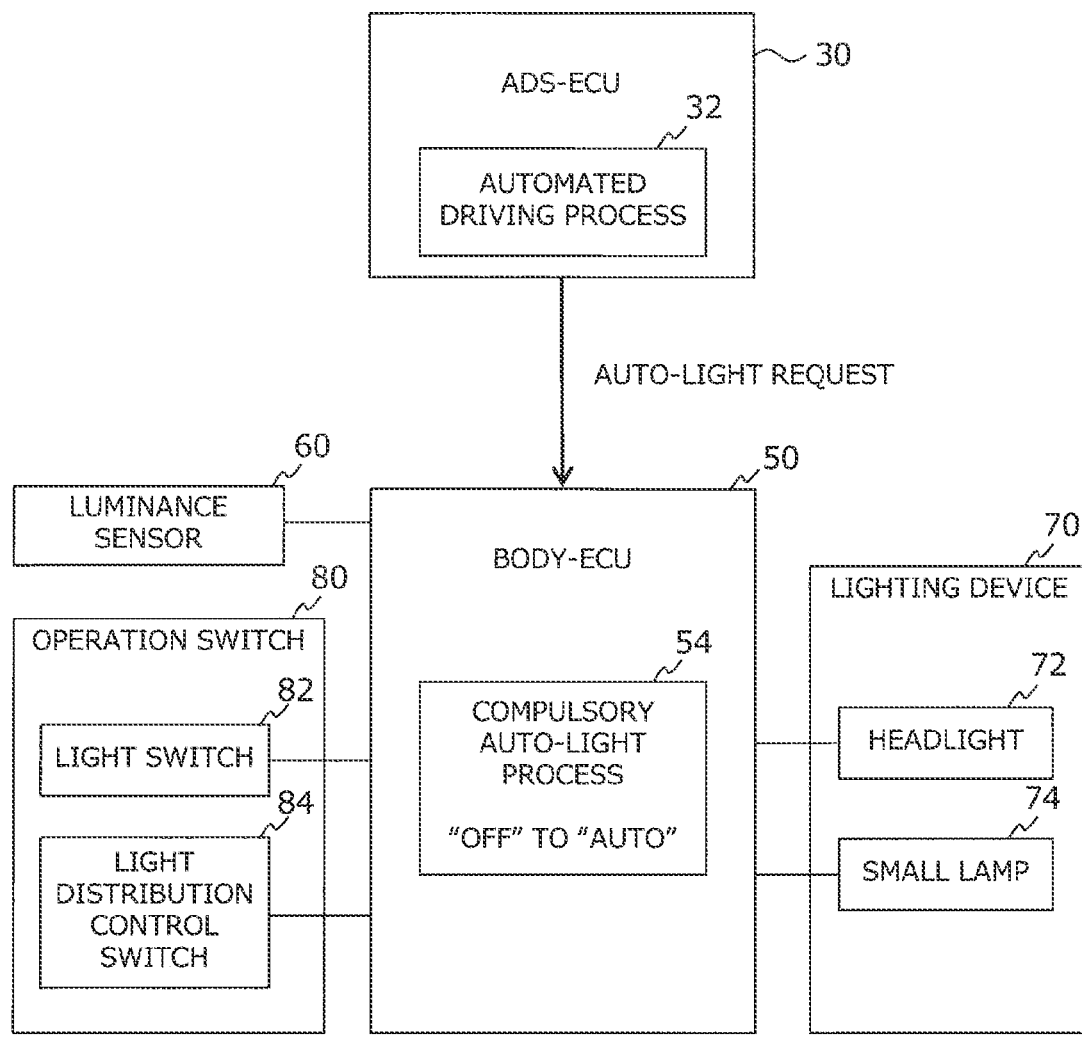
FIG. 5 is a functional block diagram of the vehicle control system for executing a compulsory auto-light control according to the first embodiment.

FIG. 5 is a functional block diagram of the vehicle control system for executing the compulsory auto-light control. As shown in the drawing, the ADS-ECU 30 includes the above-described automated driving processing unit 32. The BODY-ECU 50 includes a compulsory auto-light processing unit 54. The compulsory auto-light control is executed by the cooperation between the first control system 110 including the ADS-ECU 30 and the second control system including the BODY-ECU 50. Hereinafter, a specific process of the compulsory auto-light control executed in the vehicle control system of the first embodiment will be described with reference to the flowchart.

1-4. Specifically Process of Compulsory Auto-Light Control

Figure 6:
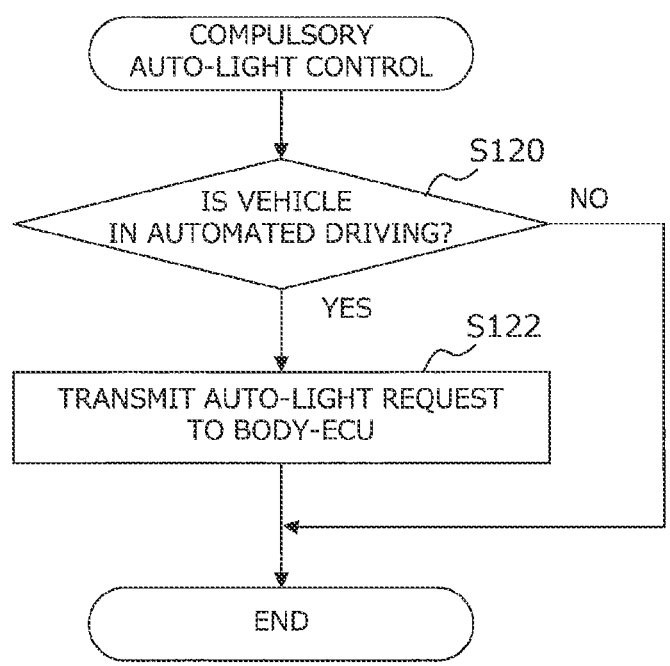
FIG. 6 is a flow chart showing a control routine executed by an ADS-ECU in the compulsory auto-light control according to the first embodiment.
Figure 7:
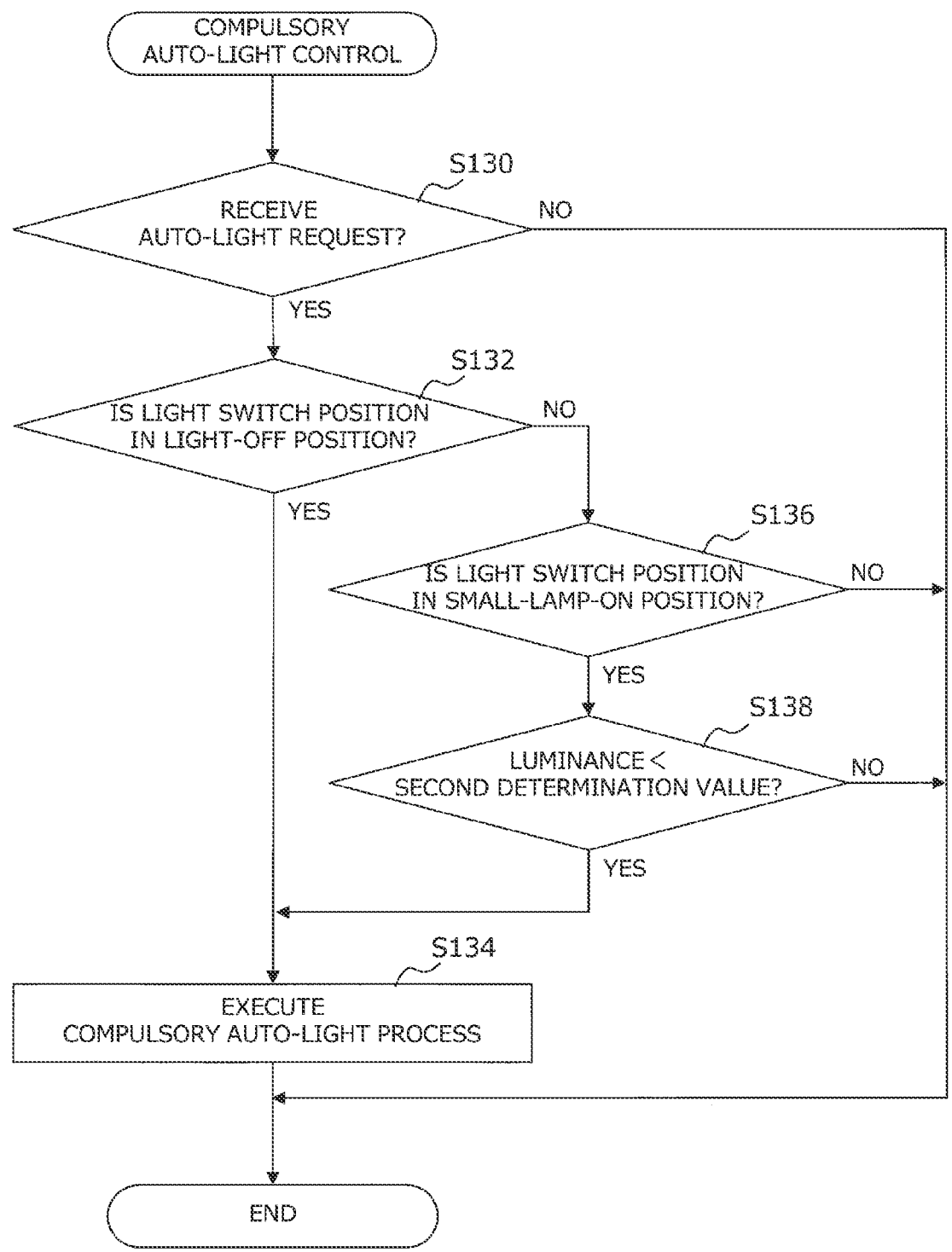
FIG. 7 is a flow chart showing a control routine executed by a BODY-ECU in the compulsory auto-light control according to the first embodiment.

FIG. 6 is a flow chart showing a control routine executed by the ADS-ECU in the compulsory auto-light control. FIG. 7 is a flow chart of control routine executed by the BODY-ECU in the compulsory auto-light control.

The routine shown in FIG. 6 is repeatedly executed in automated driving processing unit 32 of the ADS-ECU 30 at a predetermined control cycle while the vehicle M1 is traveling. First, the ADS-ECU 30 determines whether the vehicle M1 is in the automated driving (step S120). As a result, if the determination is not satisfied, it is determined that the operation of the light switch 82 by the driver should be respected, and the control routine is terminated. On the other hand, if the determination is successful, the ADS-ECU 30 transmits an auto-light request to the BODY-ECU 50 (step S122). When the process of step S122 is completed, the control routine is terminated.

The routine shown in FIG. 7 is repeatedly executed in the compulsory auto-light processing unit 54 of the BODY-ECU 50 at a predetermined control cycle while the vehicle M1 is traveling. First, the BODY-ECU 50 determines whether the auto-light request has been received from the ADS-ECU 30 (step S130). As a result, if the determination is not established (NO in step S130), the control routine is terminated. On the other hand, if the determination is successful (YES in step S130), the BODY-ECU 50 determines whether or not the light switch position is in the "light-off position" (step S132). Here, the BODY-ECU 50 determines whether or not the light-off signal is inputted from the light switch 82. As a result, when the determination is successful, it is determined that the headlight 72 is not turned on even in a dark place, and the auto-light process for turning on or off the headlight 72 in accordance with the luminance information is compulsorily executed (step S134). Here, the BODY-ECU 50 executes the auto-light process according to the flow chart shown in FIG. 4. When the process of step S134 is completed, the control routine is terminated.

On the other hand, when the determination is not satisfied in the process of the above step S132, the BODY-ECU 50 determines whether or not the light switch position is the "small-lamp-on position" (step S136). Here, the BODY-ECU 50 determines whether or not the small lamp on signal is inputted from the light switch 82. As a result, when the determination is not satisfied, it is determined that the light switch position is the "light-on position" or the "auto-light position". In this case, since the headlight 72 is always turn on in a dark place, the control routine is terminated.

On the other hand, if the determination is successful in the process of the step S136, the BODY-ECU 50 determines whether or not the received luminance is smaller than the second determination value (step S138). As a result, if the determination is not satisfied, it is determined that the external environment does not require the headlight 72 to be turned on. In this case, it is determined that the operation of the light switch 82 by the driver should be respected, and the control routine is terminated.

On the other hand, if the determination is successful in the process of the above-described step S138, it is determined that the external environment requires the headlight 72 to be turned on. In this case, the process shifts to the above-described step S134, and the auto-light process is compulsorily executed.

As described above, according to the vehicle control system of the first embodiment, the first control system 110 including the ADS-ECU 30 and the second control system 120 including the BODY-ECU 50 cooperate with each other to prevent the lighting state of the lighting device 70 during the automated driving from becoming darker than the lighting state corresponding to the light switch position. As a result, it is prevented that it is difficult to continue the automated driving because the forward visibility may not be clearly obtained in a dark place. In such a situation, even if a request for switching to the manual operation is issued, the driver may change the operation with a sense of security.

1-4. Modified Examples

The vehicle control system 100 according to the first embodiment may adopt a modified embodiment as described below.

In the vehicle control system 100 of the first embodiment, a configuration for the light distribution control is not essential. In the vehicle control system 100 according to the first embodiment, the SAE level of the automated driving to be realized is not limited as long as the first control system 110 and the second control system operate in cooperation during the automated driving.

2. SECOND EMBODIMENT

Next, the vehicle control system according to a second embodiment will be described with reference to the drawings.

2-1. Configuration of Vehicle Control System According to Second Embodiment

The configuration of the vehicle control system according to the second embodiment is the same as that of the vehicle control system 100 of the first embodiment shown in FIG. 1. The detailed configuration of the vehicle control system according to the second embodiment is omitted.

2-2. Characteristic Functions of Vehicle Control System According to Second Embodiment The light distribution control switch 84 of the vehicle M1 is located in the dash panel. For that reason, the driver may unintentionally touch the light distribution control switch 84. When the light distribution control switch 84 is switched from ON to OFF by such an erroneous operation, the light distribution control is not executed even during the automated driving, so that there is a possibility that the forward visibility may not be clearly obtained. If a request for switching to the manual operation is issued in a situation where such a forward visibility is not obtained, the driver may not change the operation with a sense of security.

Figure 8:
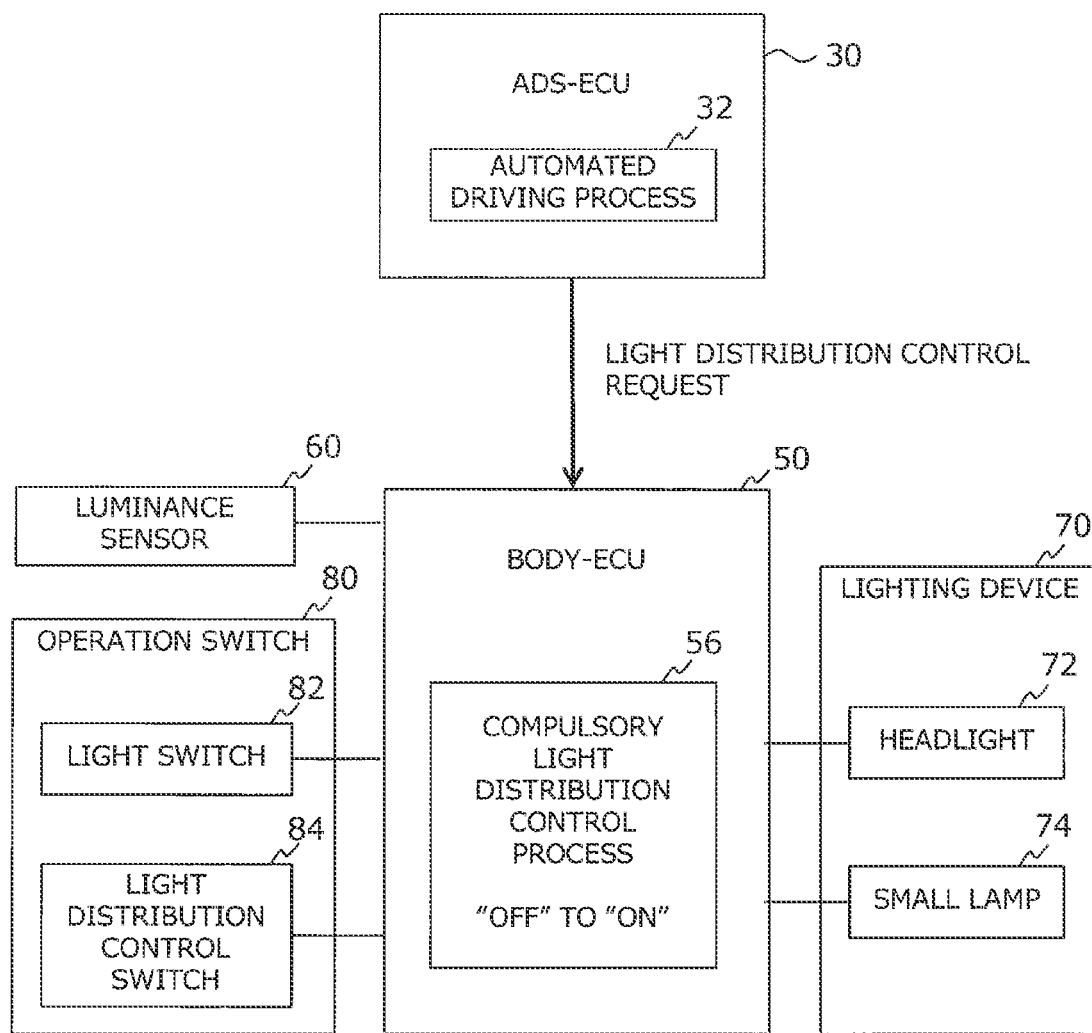
FIG. 8 is a functional block diagram of the vehicle control system for executing the compulsory light distribution control according to a second embodiment.

Accordingly, the vehicle control system of the second embodiment executes the compulsory light distribution control for compulsorily executing the light distribution control when the light distribution control switch 84 is OFF during the automated driving. FIG. 8 is a functional block diagram of a vehicle control system for executing the compulsory light distribution control. As shown in the drawing, the ADS-ECU 30 includes the above-described automated driving processing unit 32. The BODY-ECU 50 includes a compulsory light distribution control processing unit 56. The compulsory light distribution control is executed by the cooperation of the first control system 110 including the ADS-ECU 30 and the second control system including the BODY-ECU 50. Hereinafter, a specific process of the compulsory light distribution control executed in the vehicle control system of the second embodiment will be described with reference to the flowchart.

2-3. Specifically Process of Compulsory Light Distribution Control

Figure 9:
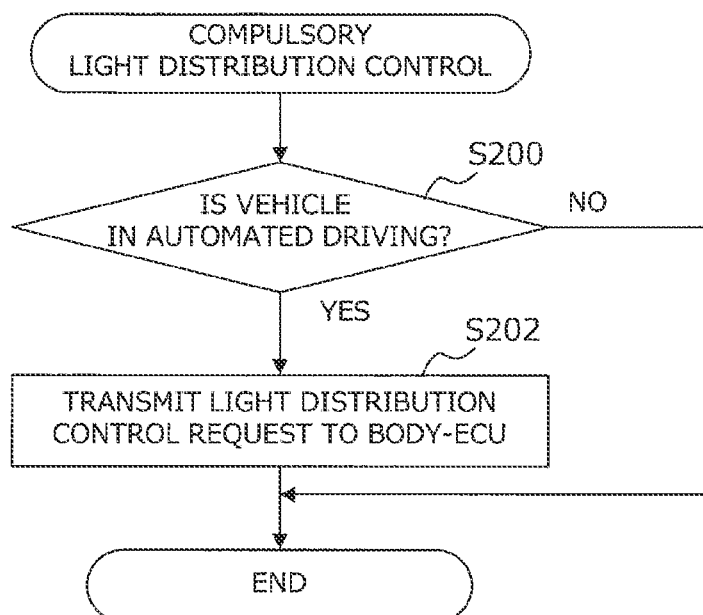
FIG. 9 is a flow chart showing a control routine executed by the ADS-ECU in the compulsory light distribution control according to the second embodiment.
Figure 10:
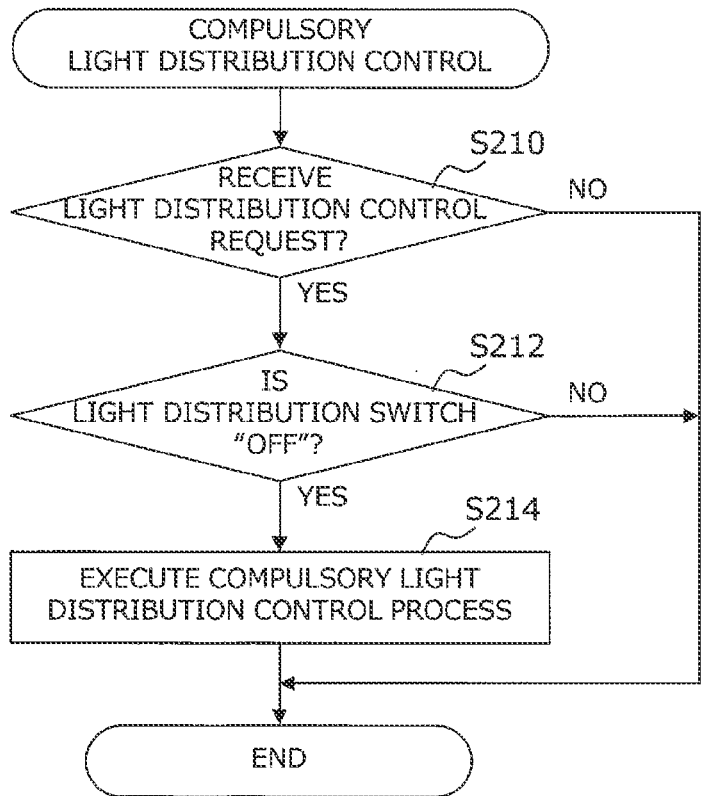
FIG. 10 is a flow chart showing a control routine executed by the BODY-ECU in the compulsory light distribution control according to the second embodiment.

FIG. 9 is a flow chart showing a control routine executed by the ADS-ECU in the compulsory light distribution control. FIG. 10 is a flow chart showing a control routine executed by the BODY-ECU in the compulsory light distribution control.

The routine shown in FIG. 9 is repeatedly executed in the automated driving processing unit 32 of the ADS-ECU 30 at a predetermined control cycle while the vehicle M1 is traveling. First, the ADS-ECU 30 determines whether the vehicle M1 is in the automated driving (step S200). As a result, if the determination is not satisfied, it is determined that the operation of the light switch 82 by the driver should be respected, and the control routine is terminated. On the other hand, if the determination is successful, the ADS-ECU 30 transmits a light distribution control request to the BODY-ECU 50 (step S202). When the process of step S202 is completed, the control routine is terminated.

The routine shown in FIG. 10 is repeatedly executed in the compulsory light distribution control processing unit 56 of the BODY-ECU 50 at a predetermined control cycle while the vehicle M1 is traveling. First, the BODY-ECU 50 determines whether the light distribution control request has been received from the ADS-ECU 30 (step S210). As a result, if the determination is not established (NO in step S210), the control routine is terminated. On the other hand, if the determination is established (YES in step S210), the BODY-ECU 50 determines whether or not the light distribution control switch 84 is OFF (step S212). Here, the BODY-ECU 50 determines whether or not the light distribution control-off signal is inputted from the light distribution control switch 84. As a result, if the determination is successful, the compulsory light distribution control process of compulsorily turning on the light distribution control is executed (step S214). When the process of step S214 is completed, the control routine is terminated. On the other hand, if the determination is not satisfied, the light distribution control is already ON, and thus the present control routine is terminated.

As described above, according to the vehicle control system of the second embodiment, the first control system 110 including the ADS-ECU 30 and the second control system 120 including the BODY-ECU 50 cooperate with each other to compulsorily turn on the light distribution control during the automated driving. As a result, it is prevented that it is difficult to continue the automated driving because the forward visibility may not be clearly obtained in a dark place. In such a situation, even if a request for switching to the manual operation is issued, the driver may change the operation with a sense of security.

2-4. Modified Examples

The vehicle control system of the second embodiment may adopt a modified embodiment described below.

In the vehicle control system of the second embodiment, the compulsory auto-light control executed in the vehicle control system 100 of the first embodiment may be executed together with the compulsory light distribution control.

The content of the light distribution control realized in the vehicle control system of the second embodiment is not limited. In addition, if the first control system 110 and the second control system 120 operate in cooperation during the automated driving, the SAE level of the automated driving to be realized is not limited.

3. THIRD EMBODIMENT

Next, the vehicle control system according to the third embodiment will be described with reference to the drawings.

3-1. Configuration of Vehicle Control System According to Third Embodiment

The configuration of the vehicle control system according to the third embodiment is the same as that of the vehicle control system 100 of the first embodiment shown in FIG. 1. The detailed configuration of the vehicle control system according to the third embodiment is omitted.

3-2. Characteristic Functions of Vehicle Control System According to Third Embodiment In the automated driving at level 3 or higher in the level definition of SAE, the second task is permitted for the driver.

For this reason, in the automated driving at the level 3 or more, the possibility that the driver unintentionally touches the operation switch 80 is increased as compared with the case of the manual operation. If the lighting or light distribution of the headlight 72 for securing the forward visibility is prevented by an erroneous operation of the operation switch 80 by hand, it becomes difficult to continue the automated driving, and a request for switching to the manual operation is issued. However, in a situation where the forward visibility is not obtained, the driver may not change driving with a sense of security.

The vehicle control system according to the third embodiment executes a specific operation rejection control for rejecting the manual specific operation of the operation switch 80 when it is determined that the vehicle is in the automated driving state. The specific operation includes the operation of the light switch 82 to the "light-off position" and the operation of the light distribution control switch 84 to the OFF position.

Figure 11:
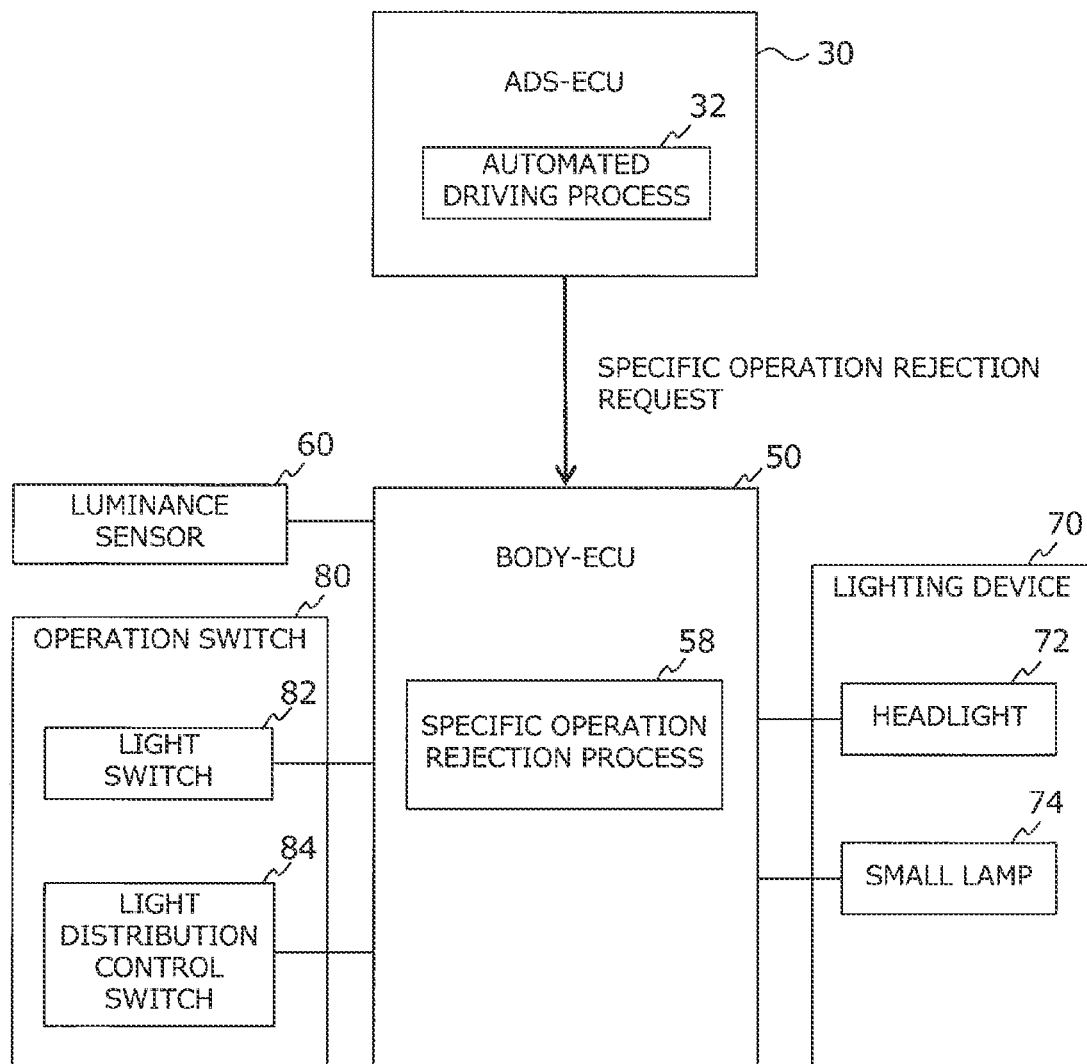
FIG. 11 is a functional block diagram of the vehicle control system for executing a specific operation rejection control according to a third embodiment.

FIG. 11 is a functional block diagram of the vehicle control system for executing the specific operation rejection control. As shown in the drawing, the ADS-ECU 30 includes the above-described automated driving processing unit 32. The BODY-ECU 50 includes a specific operation rejection processing unit 58. The specific operation rejection control is executed by the cooperation between the ADS-ECU 30 included in the first control system 110 and the BODY-ECU 50 included in the second control system 120. Hereinafter, a specific process executed in the specific operation rejection control will be described with reference to a flow chart.

3-3. Specifically Process of Specific Operation Rejection Control

Figure 12:
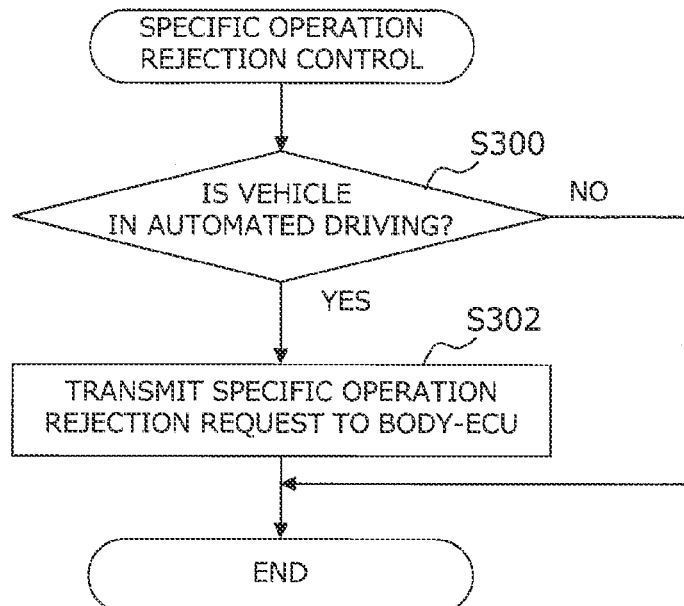
FIG. 12 is a flow chart showing a control routine executed by the ADS-ECU in the specific operation rejection control according to the third embodiment.
Figure 13:
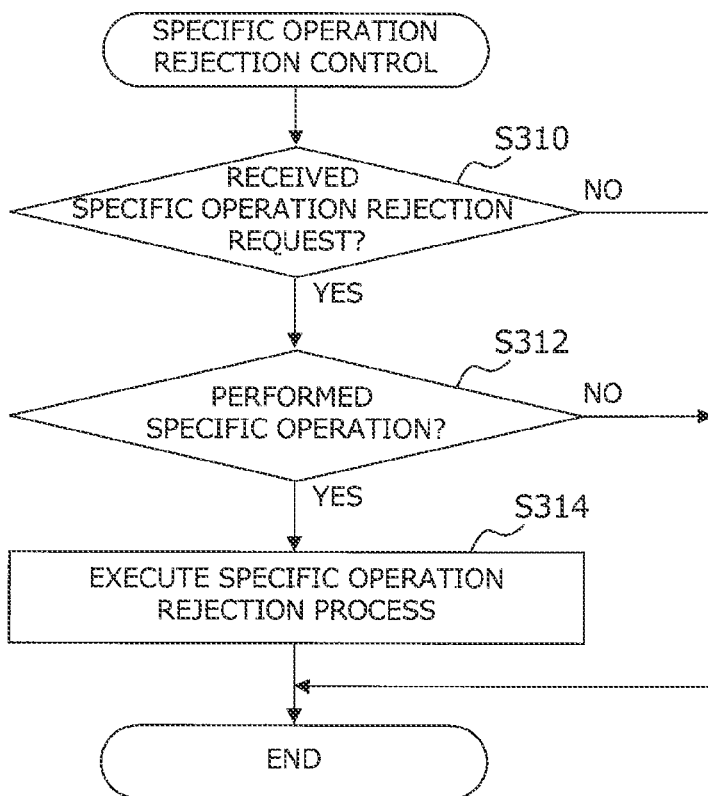
FIG. 13 is a flow chart showing a control routine executed by the BODY-ECU in the specific operation rejection control according to the 3 embodiment.

FIG. 12 is a flow chart showing a control routine executed by the ADS-ECU in the specific operation rejection control. FIG. 13 is a flow chart showing a control routine executed by the BODY-ECU in the specific operation rejection control.

The routine shown in FIG. 12 is repeatedly executed in automated driving processing unit 32 of the ADS-ECU 30 at a predetermined control cycle while the vehicle M1 is traveling. First, the ADS-ECU 30 determines whether the vehicle M1 is in the automated driving (step S300). As a result, when it is determined that the determination is not satisfied, it is determined that the operation of the operation switch 80 by the driver should be respected, and the control routine is terminated. On the other hand, if the determination is affirmative, the ADS-ECU 30 transmits a request for rejecting the specified manipulation to the BODY-ECU 50 in step S302. When the process of step S302 is completed, the control routine ends.

The routine shown in FIG. 13 is repeatedly executed in the specific operation rejection processing unit 58 of the BODY-ECU 50 at a predetermined control cycle while the vehicle M1 is traveling. First, the BODY-ECU 50 determines whether a request to deny a particular manipulation has been received from the ADS-ECU 30 (step S310). As a result, if the determination is not established (NO in step S310), the control routine is terminated. On the other hand, if the determination is confirmed (YES in step S310), the BODY-ECU 50 determines whether or not a specific operation has been performed by the operation switch 80 (step S312). Specifically, it is determined whether or not a signal indicating the operation of the light switch 82 to the "light off position" or the operation of the light distribution control switch 84 to the "OFF" is input from the operation switch 80. As a result, if the determination is not established (NO in step S312), the control routine is terminated. On the other hand, if the determination is successful (YES in step S312), the BODY-ECU 50 executes a specific operation rejection process (step S314). Here, the BODY-ECU 50 refuses to change the operation of the lighting device 70 based on the signals of the particular operation. When the process of step S314 is completed, the present control routine is terminated.

Thus, according to the vehicle control system 100 of the third embodiment, by linking the ADS-ECU 30 and the BODY-ECU 50, it is possible to refuse a particular operation of the lighting device 70 during autonomous driving. As a result, it is possible to prevent an unintentional change in the operation of the lighting device 70 from causing a problem in securing the visibility ahead.

3-4. Modified Examples

The vehicle control system 100 according to the third embodiment may adopt a modified mode as described below.

In the vehicle control system of the third embodiment, the compulsory auto-light control executed in the vehicle control system 100 of the first embodiment may be executed together with the specific operation rejection control. In the vehicle control system of the third embodiment, the compulsory light distribution control executed in the vehicle control system 100 of the second embodiment may be executed together with the specific operation rejection control.

In a system including a light switch having a "small-lamp-on position" as the light switch position that can be manually switched, such as the light switch 82 shown in FIG. 3, the specific operation may include the operation of the light switch 82 to the "small-lamp-on position".

What is claimed is:
1. A vehicle control system installed on a vehicle, the vehicle including a light switch for manually operating a lighting state of a lighting device installed on a body, the lighting device including a small lamp including a side marker lamp or a tail lamp, and a headlight, the light switch including a small-lamp-on position for constantly lighting the small lamp, and an auto-light position to execute an auto-light process in which the lighting state of the lighting device is automatically switched according to a luminance of an external environment, the system comprising:
    a first controller configured to execute an automated driving of the vehicle; and
    a second controller configured to control a lighting state of the lighting device based on a request from the first controller or operation information of the light switch,
    wherein the first controller is configured to transmit an auto-light request for executing the auto-light process to the second controller during execution of the automated driving,
    wherein the auto-light process is configured to turn on the small lamp when a luminance of an external environment detected by a luminance sensor is smaller than a predetermined first determination value, and to turn on the headlight when the luminance is smaller than a second determination value smaller than the first determination value, and
    wherein the second controller is configured to execute the auto-light process when the luminance is smaller than the second determination value in a case where the auto-light request is received from the first controller in a state where the light switch is operated to the small-lamp-on position.

2. The vehicle control system according to claim 1, wherein the first controller is configured to transmit, during execution of the automated driving, a specific operation rejection request for executing a specific operation rejection process for rejecting control of the lighting device based on a specific operation of the light switch to the second controller, wherein the specific operation includes an operation of the light switch to the small-lamp-on position, wherein the second controller is configured to execute the specific operation rejection process when the specific operation rejection request is received from the first controller.

3. A vehicle control system installed on a vehicle, the vehicle including a light switch for manually operating a lighting state of a lighting device installed on a body, the lighting device including a headlight capable of adjusting a light distribution, the light switch including a light distribution control switch for operating ON and OFF of a light distribution control for automatically controlling the light distribution of the headlight according to an external environment, the system comprising:

a first controller configured to execute an automated driving of the vehicle; and a second controller configured to control a lighting state of the lighting device based on a request from the first controller or operation information of the light switch, wherein the second controller is configured to execute the light distribution control when the light distribution control switch is operated to be ON, and stop the light distribution control when the light distribution control switch is operated to be OFF, wherein the first controller is configured to transmit a light distribution control request for executing the light distribution control to the second controller during execution of the automated driving, wherein the second controller is configured to execute the light distribution control when the light distribution control request is received from the first controller in a state where the light distribution control switch is operated to be OFF.

4. The vehicle control system according to claim 3, wherein the first controller is configured to transmit, during execution of the automated driving, a specific operation rejection request for executing a specific operation rejection process for rejecting control of the lighting device based on a specific operation of the light switch to the second controller, wherein the specific operation includes an operation to OFF of the light distribution control switch, wherein the second controller is configured to execute the specific operation rejection process when the specific operation rejection request is received from the first controller.

* * * * *